April 22, 1969    R. V. WISE    3,439,540
TAPE THERMOMETER HOLDERS

Filed March 31, 1966    Sheet 1 of 2

Robert V. Wise

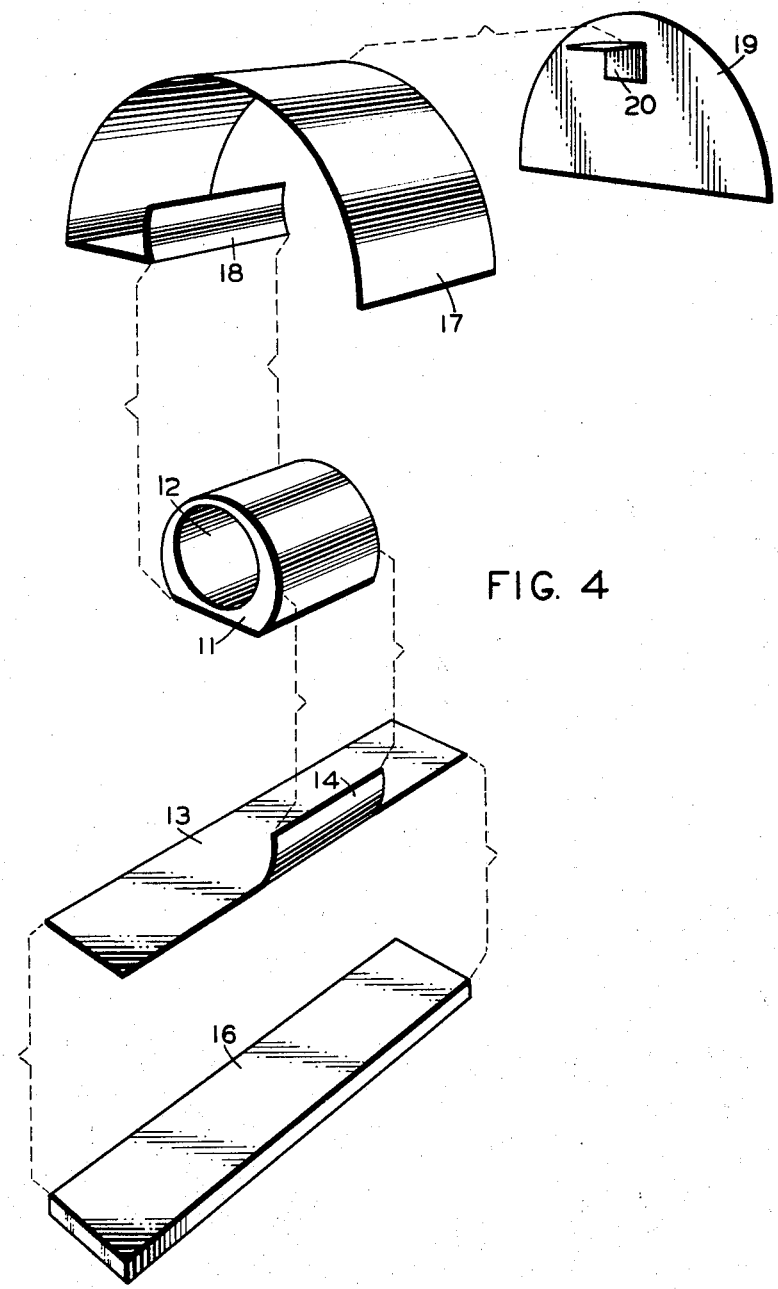

United States Patent Office 3,439,540
Patented Apr. 22, 1969

3,439,540
TAPE THERMOMETER HOLDERS
Robert V. Wise, 512 Stehley St.,
Anaheim, Calif. 92806
Filed Mar. 31, 1966, Ser. No. 541,461
Int. Cl. G01k 1/08
U.S. Cl. 73—344                                  1 Claim

ABSTRACT OF THE DISCLOSURE

A thermometer holder with an insulated clip to fasten it to a surveyor's tape so as to determine the tape temperature. The holder has a thermometer housing and sunshades to avoid heating of the thermometer by incident sunlight.

---

This invention relates specifically to tape thermometer holders which temporarily fasten to a surveyor's tape and which carry a thermometer that determines the temperature of the tape.

Since 100 foot surveyor's tapes can vary almost an inch in length due to temperature changes, it is necessary for surveyors to make accurate temperature corrections to measured lengths if they wish to execute surveys of even moderate precision. But air temperatures do not suffice for this purpose, for suveyor's tapes in the sun always become hotter than the air. Therefore, surveyors who seek accuracy usually resort to the tape thermometer holder most commonly used today. But this thermometer holder is designed primarily for use at night or under heavy overcast, and its use in sunlight induces serious errors in the thermometer readings. It does so because the rates of absorption of the sun's heat varies greatly between the tape and the thermometer holder—not only throughout the day but from day to day throughout the year.

A surveyor's tape is only from 15 to 20 thousandths of an inch thick, and therefore may be regarded as a one dimensional horizontal surface. Consequently, the tape's absorption rate is unaffected by changes in the sun's azimuth, and the rate varies only with sine $h$—with the sine of the altitude of the sun. But the standard tape thermometer holder has both vertical and horizontal surfaces, and its absorption rate varies with the expression sine $h$+cosine $h$ cosine $a$, where $h$ is the altitude of the sun and $a$ is the difference in azimuth between the sun and the longitudinal axis of the thermometer holder. Furthermore, the absorption rates of the tape and the thermometer holder not only vary differently, they may even vary in opposite directions, with serious errors in thermometer readings as a result.

Another weakness of the standard tape thermometer holder is that it does not respond so much to the heat of the tape as it does to the heat it, itself, absorbs from the sun. The standard tape thermometer holder in use today has blackened surfaces. But if these surfaces are painted white and the holder is placed on a surveyor's tape together with an unpainted holder, the thermometer in the former will read considerably lower than the latter. This would not be true if the thermometer were measuring the heat of the tape rather than that of the holder.

Consequently, one object of this invention is to provide a tape thermometer holder whose accuracy is unaffected by changes in the altitude or azimuth of the sun.

Another object of this invention is to provide a tape thermometer holder in which the heat entering the holder depends only on the heat entering the tape.

Other objects and a fuller understanding of this invention may be had by referring to the following description and claim, taken in conjunction with the following drawings in which:

FIGURE 4 is an exploded perspective view of the invention.

Figure 1:
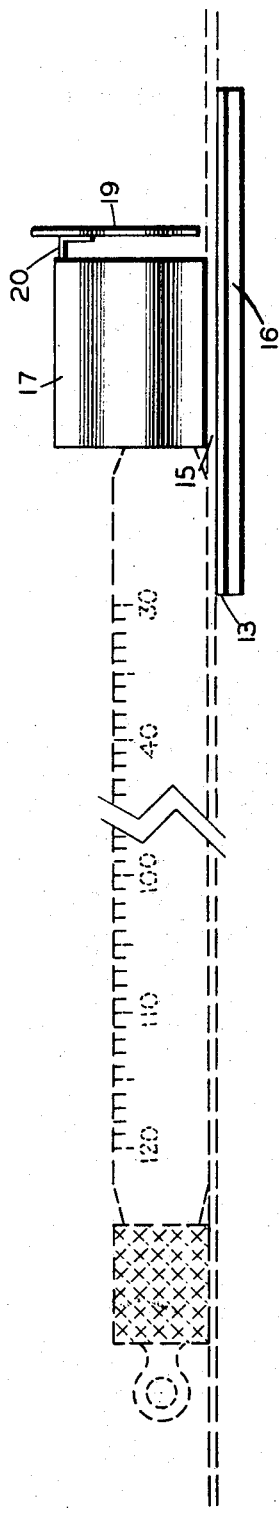
FIGURE 1 is a side view of the invention showing how it is used on a surveyor's tape in conjunction with a standard pocket thermometer.
Figure 3:
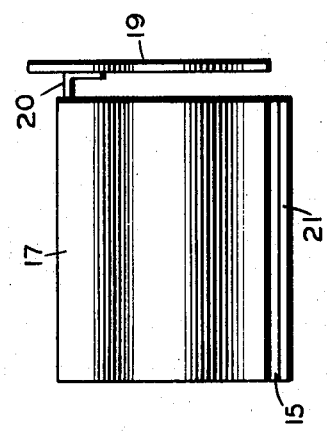
FIGURE 3 is a side view of a variation on the basic invention.
Figure 2:
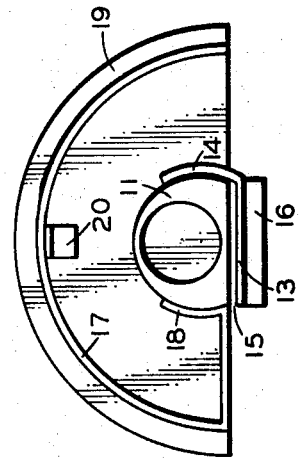
FIGURE 2 is an end view of the invention.

With reference to the drawings, this invention comprises, in general, a thermometer bulb housing 11 consisting of a brass fitting as long as the bulb on a standard pocket thermometer; a thermometer bulb hole 12 drilled centrally through said housing 11; the diameter of said hole 12 being slightly larger than the diameter of the thermometer bulb, the diameters of said housing 11 and said hole 12 being such that the vertical dimension of the housing 11 is four hundredths of an inch greater than the diameter of the hole 12 when the width of the bottom of the housing 11 is equal to the width of a surveyor's tape; a metal clip 13 approximately three times as long as said housing 11 having a tab 14 centrally located on said clip 13 and extending upwardly from one side of said clip 13; said tab 14 being rigidly attached to the side of the housing 11 so as to leave a slot 15 between the clip 13 and the housing 11, said slot 15 being just wide enough to receive a surveyor's tape; a strip of insulating material 16 rigidly affixed to the bottom of the clip 13; a sunshade 17 extending substantially around and over said housing 11, said sunshade 17 having a tab 18, said tab 18 being rigidly affixed to the housing 11 so as to leave a substantial air space between said sun shade 17 and said housing 11; an end shade 19, having a tab 20, said tab 20 being rigidly affixed to the top of said sunshade 17 so as to leave a ventilating space between said sunshade 17 and said end shade 19, the diameter of said endshade 19 being enough greater than that of the sunshade 17 so as to prevent the sun's rays from striking the thermometer bulb housing 11 regardless of the altitude and azimuth of the sun.

In practice, the thermometer holder is temporarily fastened to a surveyor's tape by sliding the tape into the slot 15 between the housing 11 and the clip 13, with the thermometer bulb inserted into the hole 12, the body of the thermometer resting on top of the tape. The holder must be placed on the tape so that the sun strikes the side of the holder opposite the thermometer. Under these circumstances, the thermometer bulb housing 11, and consequently the thermometer bulb itself, is exposed to two different temperatures, namely, the air temperature found in the air space between the sun shade 17 and the housing 11, and the temperature of a portion of the tape whose underside is insulated. The mean of these two temperatures, which is read by the thermometer, is the exact temperature of the tape in sunlight, as the following considerations show.

When a surveyor's tape is held above the ground in the shade, it assumes the air temperature. If it is then carried into the sunlight, its temperature will begin rising, and will continue to rise until thermal equilibrium is reached. At this point, the tape temperature stabilizes because the tape is now emitting into the atmosphere exactly as much heat as it is getting from the sun, half of the heat being emitted from the top of the tape, the other half from the bottom. But when the bottom of the tape is insulated, heat cannot escape by this route. It is, therefore, reflected back through the tape, and causes another rise in tape temperature that is exactly equal to the difference between the air temperature and the temperature of the tape in sunlight. In other words, the temperature of the tape in sunlight is exactly half way between the air temperature and the insulated tape temperature.

This fact is derived from one of the basic laws of thermodynamics, which reads as follows:

$$H = AC(T_2 - T_1)$$

where H equals the amount of heat being emitted from a given body, A equals the area of the emitting surface, C equals the coefficient of emission of that surface, $T_2$ equals the temperature of the heated body, and $T_1$ equals the air temperature. But when the underside of the tape is insulated the area of the emitting surface is cut exactly in half. Consequently, the equation to fit this new circumstance is:

$$H = AC(T_3 - T_1)/2$$

where $T_3$ equals the insulated tape temperature. Now if we solve both of the above equations for the expression $H/AC$ we get, respectively, $$H/AC = T_2 - T_1$$

and $$\frac{H}{AC} = \frac{T_3 - T_1}{2}$$

Setting the right hand members of these equations equal to each other, we get, $$T_2 - T_1 = \frac{T_3 - T_1}{2}$$

and solving this equation for $T_2$ gives us, $$T_2 = \frac{T_3 + T_1}{2}$$

That is, the temperature of the tape in sunlight is equal to the mean of the insulated tape temperature and the air temperature. And the basic purpose of my invention is to provide a means of exposing a thermometer bulb to both of these temperatures at the same time so that it will take a mean of the two and thus provide surveyors with exact tape temperatures.

A variation on this invention is seen in FIGURE 4, in which the only differences are that the length of the clip 21 has been reduced to equal the length of the thermometer bulb housing 11, and the insulation 16 has been omitted. In this variation, the thermometer would determine the mean of the air temperature and the true tape temperature. Therefore, it would also be necessary to find the air temperature and then add the difference between the air temperature and the mean temperature to the mean temperature to get the true tape temperature.

Although this invention has been described with a certain degree of particularity, it is understood that the present disclosure has been made only by way of example, and that numerous changes in the details of construction and the combination and arrangement of parts may be resorted to without departing from the spirit and scope of the invention as hereinafter claimed.

I claim as my invention:

1. A holder coupling a thermometer to a tape measure comprising, a thermometer housing having a semicircular ventilated sunshade extending substantially around the top of the housing, an end cover shade coupled to said sunshade by a tab, and a clip mounted centrally beneath said housing, the underside of said clip being covered with insulating material whereby the thermometer housing is urged into a heat transfer relationship with the tape so as to sense its temperature without loss of accuracy due to changes in altitude or azimuth of the sun.

References Cited

UNITED STATES PATENTS

| | | | |
|---|---|---|---|
| 465,054 | 12/1891 | Dodge | 73—378 |
| 1,339,288 | 5/1920 | Richards | 73—378 |
| 1,377,578 | 5/1921 | Harris | 73—343 |
| 2,037,194 | 4/1936 | Curtin | 73—376 |
| 2,077,039 | 4/1937 | Collens | 73—374 |
| 2,112,648 | 3/1938 | Brown | 73—343 |
| 2,240,980 | 4/1941 | Carlson | 73—376 |
| 2,489,684 | 11/1949 | Stewart et al. | 73—343 |
| 2,636,240 | 4/1953 | Pokorny | 73—374 |
| 2,906,129 | 9/1959 | Chaney | 73—374 |
| 2,820,296 | 1/1958 | Fabian | 73—344 |

FOREIGN PATENTS

| | | |
|---|---|---|
| 838,220 | 1952 | Germany. |

LOUIS R. PRINCE, *Primary Examiner.*

F. SHOON, *Assistant Examiner.*

U.S. Cl. X.R.

73—374; 33—137